(12) United States Patent
Ozawa

(10) Patent No.: US 9,219,841 B2
(45) Date of Patent: *Dec. 22, 2015

(54) IMAGE-PROCESSING DEVICE IDENTIFYING OBJECT IN IMAGE SPECIFIED BY ENCIRCLING LINE

(71) Applicant: Brother Kogyo Kabushiki Kaisha, Nagoya-shi, Aichi-ken (JP)

(72) Inventor: Ryohei Ozawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/225,523

(22) Filed: Mar. 26, 2014

(65) Prior Publication Data

US 2014/0293383 A1    Oct. 2, 2014

(30) Foreign Application Priority Data

Mar. 28, 2013  (JP) ................................. 2013-068397

(51) Int. Cl.
  *G06K 9/48* (2006.01)
  *H04N 1/23* (2006.01)
  *H04N 1/387* (2006.01)
  *H04N 1/62* (2006.01)

(52) U.S. Cl.
  CPC ........... *H04N 1/2338* (2013.01); *H04N 1/3872* (2013.01); *H04N 1/626* (2013.01); *H04N 2201/0082* (2013.01); *H04N 2201/0091* (2013.01)

(58) Field of Classification Search
  CPC ... H04N 1/2338; H04N 1/3872; H04N 1/626; H04N 1/56; H04N 2201/0091; H04N 2201/0082

USPC .................................. 382/199, 284; 358/538
See application file for complete search history.

(56) References Cited

U.S. PATENT DOCUMENTS

| | | | |
|---|---|---|---|
| 8,743,136 B2 * | 6/2014 | Besley | 345/592 |
| 8,947,741 B2 * | 2/2015 | Suzuki et al. | 358/3.26 |
| 2003/0103683 A1 * | 6/2003 | Horie | 382/284 |
| 2006/0045372 A1 * | 3/2006 | Wang et al. | 382/254 |
| 2008/0012967 A1 * | 1/2008 | Kuwabara | 348/246 |

FOREIGN PATENT DOCUMENTS

| | | |
|---|---|---|
| JP | H03-236069 A | 10/1991 |
| JP | 03-511781 B2 | 3/2004 |
| JP | 2010-199983 A | 9/2010 |

* cited by examiner

*Primary Examiner* — Samir Ahmed
(74) *Attorney, Agent, or Firm* — Banner & Witcoff, Ltd.

(57) ABSTRACT

A computer-readable instructions in an image-processing device, when executed by a processor, cause the image-processing device to perform: acquiring a target image; identifying an encircling region and an object region; determining a first candidate region and a second candidate region by using both the encircling line region and the object region; and extracting a contacting object region including a first candidate region and a second candidate region that satisfies conditions as follows: a condition that the first candidate region is disposed on an inner peripheral side of the encircling line region, and that the second candidate region is disposed on an outer peripheral side of the encircling line region; and another condition that the first candidate region and the second candidate region abut the encircling line region, and that the first candidate region and the second candidate region confront each other across the encircling line region.

9 Claims, 9 Drawing Sheets

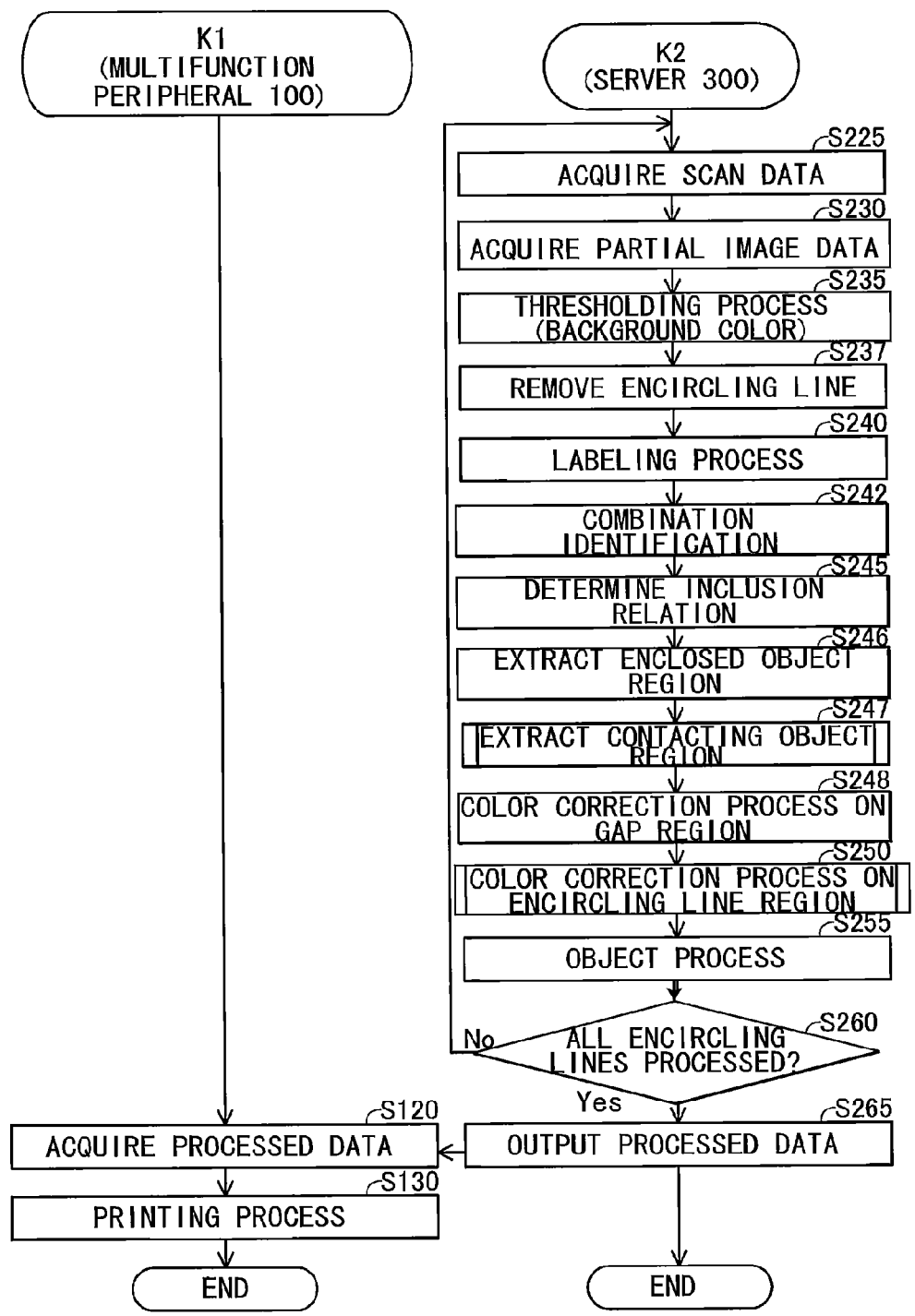

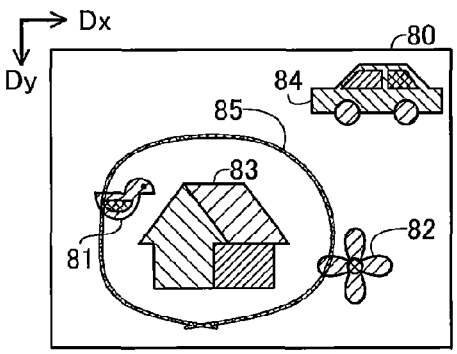
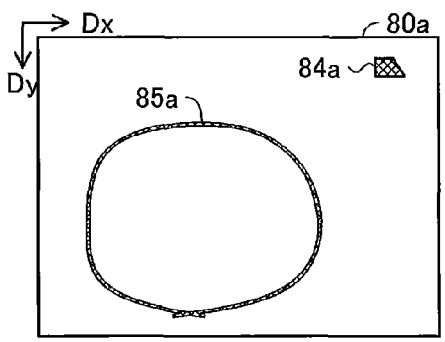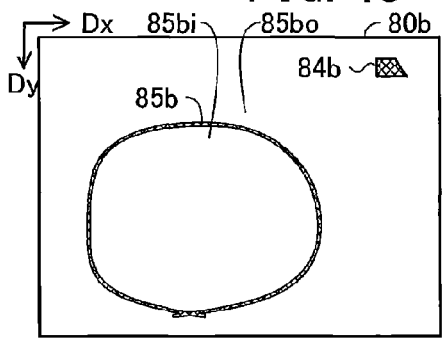
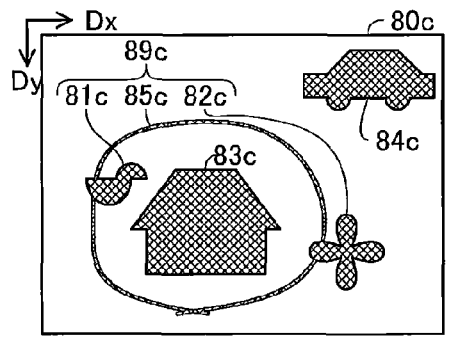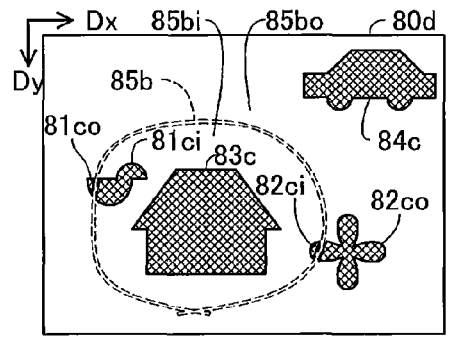
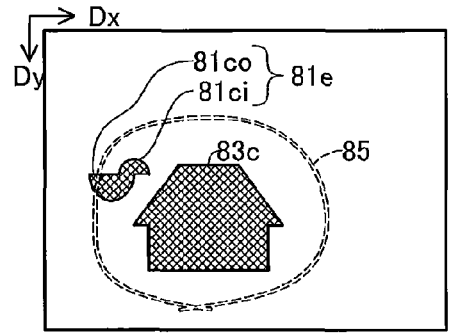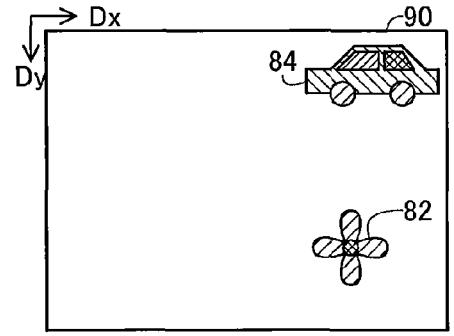

IMAGE-PROCESSING DEVICE IDENTIFYING OBJECT IN IMAGE SPECIFIED BY ENCIRCLING LINE

CROSS REFERENCE TO RELATED APPLICATION

This application claims priority from Japanese Patent Application No. 2013-068397 filed Mar. 28, 2013. The entire content of the priority application is incorporated herein by reference.

TECHNICAL FIELD

The present invention relates to an image-processing device and a computer program that employ encircling lines for identifying sub-regions of an image.

BACKGROUND

Among the various conventional image processes known in the art, one image-processing technology was proposed for photocopying only a specified part of an original. According to this technology, the photocopier processing an original inscribed with a frame-like mark copies only the part of the original surrounded by the mark.

SUMMARY

However, when the mark inscribed on the original overlaps an object in the original, such as a photo or an illustration, the photocopier may not be able to process the object appropriately. This problem is not limited to a technique using frame-like marks, but is shared by devices using encircling lines of various shapes for specifying objects.

In view of the foregoing, it is an object of the present invention to provide a technique capable of appropriately processing an object enclosed by an encircling line when the encircling line overlaps the object.

In order to attain the above and other objects, the invention provides an image-processing device comprising: a processor; and a memory storing computer-readable instructions therein, the computer-readable instructions, when executed by the processor, causing the image-processing device to perform: acquiring a target image represented by target image data; identifying an encircling line region defined by a plurality of pixels having a first color, the encircling line region specifying a part of the target image; identifying an object region defined by a plurality of pixels having a second color, the second color being different from the background color of the target image; determining a candidate region by using both the identified encircling line region and the identified object region, the candidate region being different from the encircling line region; and extracting a contacting object region, the contacting object region including a first candidate region and a second candidate region, the contacting object region satisfying the following conditions (A) and (B): (A) the first candidate region is disposed on an inner peripheral side of the encircling line region, and the second candidate region is disposed on an outer peripheral side of the encircling line region; and (B) each of the first candidate region and the second candidate region abuts the encircling line region, and the first candidate region and the second candidate region confront each other across the encircling line region.

According to another aspect, the present invention provides a non-transitory computer readable storage medium storing a set of program instructions installed on and executed by a computer, the program instructions comprising: acquiring a target image represented by target image data; identifying an encircling line region defined by a plurality of pixels having a first color, the encircling line region specifying a part of the target image; identifying an object region defined by a plurality of pixels having a second color, the second color being different from the background color of the target image; determining a candidate region by using both the identified encircling line region and the identified object region, the candidate region being different from the encircling line region; and extracting at least a first candidate region included in a contacting object region, the contacting object region including a first candidate region and a second candidate region, the contacting object region satisfying the following conditions (A), (B) and (C): (A) the first candidate region is disposed on an inner peripheral side of the encircling line region, and that the second candidate region is disposed on an outer peripheral side of the encircling line region; (B) each of the first candidate region and the second candidate region abuts the encircling line region, and that the first candidate region and the second candidate region confront each other across the encircling line region; and (C) a ratio of the first candidate region to sum of the first candidate region and the second candidate region is greater than or equal to a prescribed value.

According to another aspect, the present invention provides a non-transitory computer readable storage medium storing a set of program instructions thereon that, when executed by a computer, cause the computer to perform operations comprising: acquiring a target image represented by target image data; identifying an encircling line region defined by a plurality of pixels having a first color, the encircling line region specifying a part of the target image; identifying an object region defined by a plurality of pixels having a second color, the second color being different from a background color of the target image; determining a candidate region by using both the identified encircling line region and the identified object region, the candidate region being different from the encircling line region; and extracting a contacting object region, the contacting object region including a first candidate region and a second candidate region, the contacting object region satisfying the following conditions (A) and (B): (A) the first candidate region is disposed on an inner peripheral side of the encircling line region, and the second candidate region is disposed on an outer peripheral side of the encircling line region; and (B) each of the first candidate region and the second candidate region abuts the encircling line region, and the first candidate region and the second candidate region confront each other across the encircling line region.

According to another aspect, the present invention provides a non-transitory computer readable storage medium storing a set of program instructions thereon that, when executed by a computer, cause the computer to perform operations comprising: acquiring a target image represented by target image data; identifying an encircling line region defined by a plurality of pixels having a first color, the encircling line region specifying a part of the target image; identifying an object region defined by a plurality of pixels having a second color, the second color being different from a background color of the target image; determining a candidate region by using both the identified encircling line region and the identified object region, the candidate region being different from the encircling line region; and extracting at least a first candidate region included in a contacting object region, the contacting object region including the first candidate region and a second candidate region, the contacting object region satisfying the following conditions (A), (B) and (C): (A) the first candidate region is disposed on an inner peripheral side of the encircling line region, and that the second candidate region is disposed on an outer peripheral side of the encircling line region; (B) each of the first candidate region and the second candidate region abuts the encircling line region, and that the first candidate region and the second candidate region confront each other across the encircling line region; and (C) a ratio of the first candidate region to sum of the first candidate region and the second candidate region is greater than or equal to a prescribed value.

BRIEF DESCRIPTION OF THE DRAWINGS

In the drawings:

FIGS. 2 and 3 are consecutive flowcharts illustrating steps in an image process according to the embodiment;

FIG. 4A is a schematic diagram showing a sample image represented by scanned image;

FIG. 4B is a schematic diagram showing an example of a binary image represented by a binary image data;

FIG. 4C is a schematic diagram showing an example of the binary image represented by the binary image data that has undergone contraction and expansion processes;

FIG. 4D is a schematic diagram showing an example of a partial binary image represented by a partial binary image data;

FIG. 4E is a schematic diagram showing an example of the partial binary image;

FIG. 4F is a schematic diagram showing an extracted contacting object region and an enclosed object region;

FIG. 4G is a schematic diagram showing an example of a processed image;

DETAILED DESCRIPTION

A. First Embodiment

Figure 1:
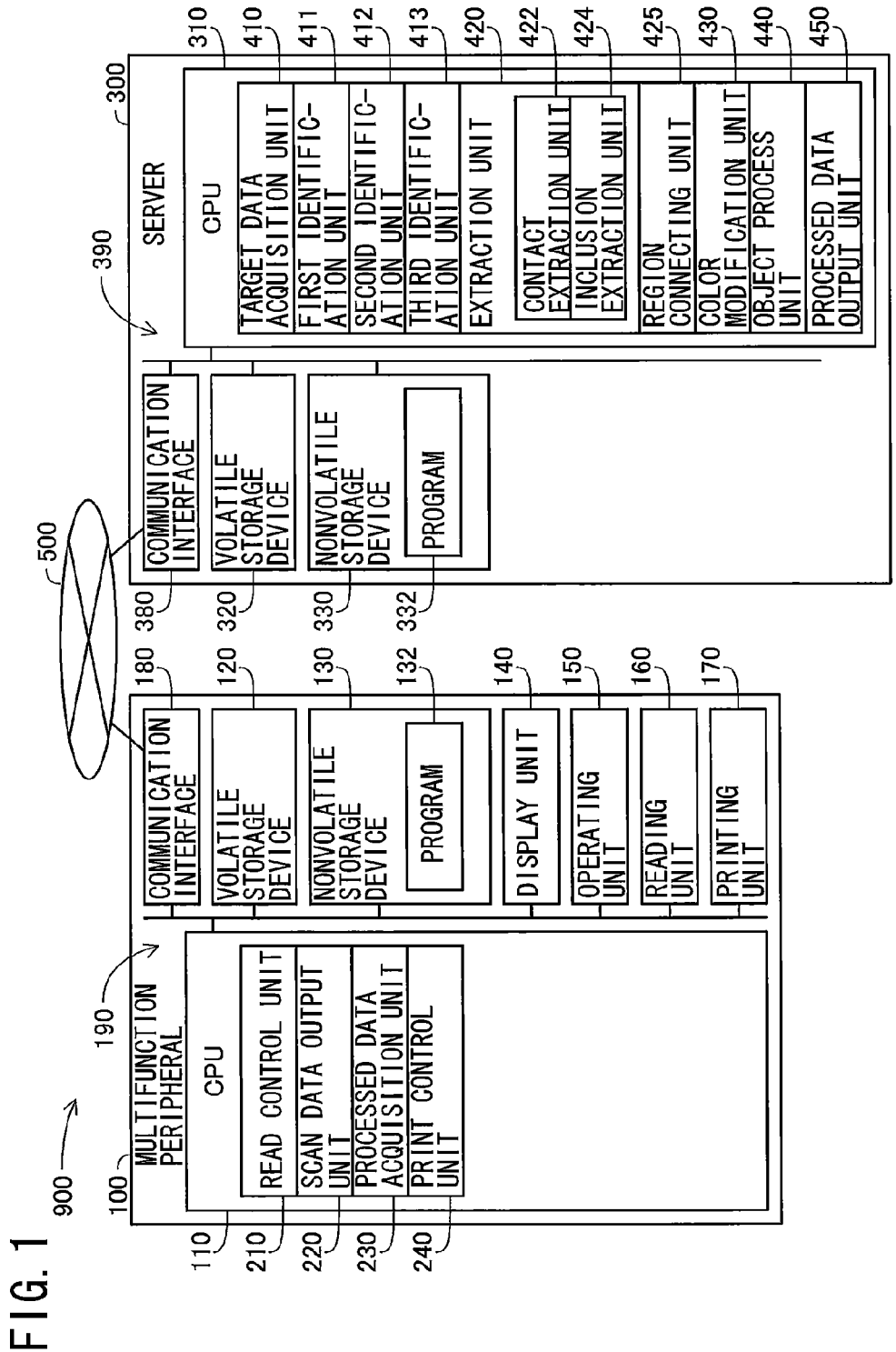
FIG. 1 is a block diagram showing a structure of an image-processing system according to an embodiment of the present invention

An image-processing system 900 according to a first embodiment of the present invention will be described with reference to FIGS. 1 to 5. FIG. 1 is a block diagram showing the structure of an image-processing system 900 according to the first embodiment of the present invention. The image-processing system 900 is configured of a network 500, a multifunction peripheral 100 connected to the network 500, and a server 300 also connected to the network 500. The multifunction peripheral 100 can execute a process for copying an original in response to a command from the user. More specifically, the multifunction peripheral 100 optically scans an original and prints an image based on the scan data. An original may represent a plurality of objects that may include text, photos, and illustrations. The user can draw a line around each object in the original (hereinafter called an "encircling line") using a pen having a prescribed color (red, in the first embodiment). The multifunction peripheral 100 and server 300 execute an image process to print an image acquired by erasing any object surrounded by an encircling line from the scanned image.

The multifunction peripheral 100 includes a CPU 110 for performing overall control of the multifunction peripheral 100; a volatile storage device 120, such as DRAM; a nonvolatile storage device 130, such as a flash memory; a display unit 140 such as a liquid crystal panel; an operating unit 150 such as a touchscreen; a reading unit 160; a printing unit 170; and a communication interface 180 (a wireless communication interface conforming to the IEEE 802.11a/b/g/n standards, for example) for communicating with other devices, such as the server 300. The nonvolatile storage device 130 stores a program 132. The communication interface 180 is connected to the network 500.

The reading unit 160 generates image data representing an original by optically scanning the original. The reading unit 160 is provided with an optical sensor such as a contact image sensor (CIS; not shown) for optically reading an original placed on the reading unit 160 to generate image data representing the original. In the following description, image data generated by the reading unit 160 will be called "scan data."

The printing unit 170 is an inkjet printer that functions to print images. However, the present invention may employ another type of printer, such as a laser printer.

The CPU 110 executes the program 132 while utilizing the volatile storage device 120 and the nonvolatile storage device 130 in order to implement data processes described later. Taken together, the CPU 110, the volatile storage device 120, and the nonvolatile storage device 130 correspond to a data-processing unit 190 used to execute the functions to implement data processes. As shown in FIG. 1, the CPU 110 functions as a read control unit 210, a scan data output unit 220, a processed data acquisition unit 230, and a print control unit 240. The functions of these process units will be described later.

The server 300 includes a CPU 310 for performing overall control of the server 300; a volatile storage device 320, such as DRAM; a nonvolatile storage device 330, such as flash memory; and a communication interface 380 (a wireless communication interface conforming to the IEEE 802.3 standard, for example) for communicating with other devices, such as the multifunction peripheral 100. The nonvolatile storage device 330 stores a program 332. The communication interface 380 is connected to the network 500.

The CPU 310 executes the program 332 while utilizing the volatile storage device 320 and nonvolatile storage device 330 to implement an image process described later. Taken together, the CPU 310, the volatile storage device 320, and the nonvolatile storage device 330 correspond to an image-processing unit 390 that serves to implement the image process. As shown in FIG. 1, the CPU 310 functions as a target data acquisition unit 410, a first identification unit 411, a second identification unit 412, a third identification unit 413, an extraction unit 420, a region consolidation unit 425, a color modification unit 430, an object process unit 440, and a processed data output unit 450. The extraction unit 420 includes a contact extraction unit 422 and an inclusion extraction unit 424. The functions of these process units will be described later.

Figure 2:
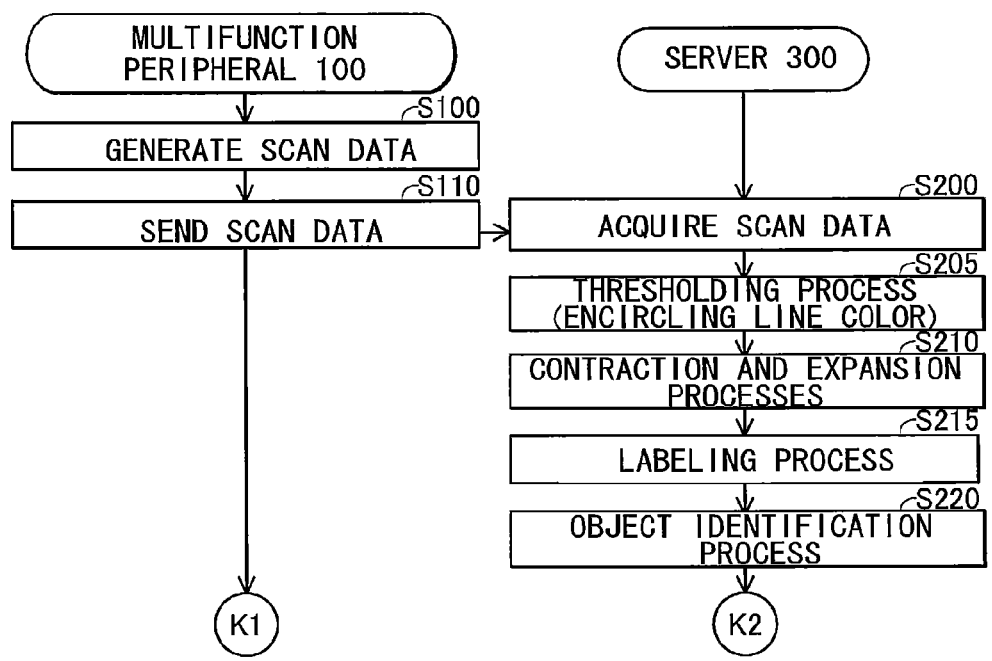

FIGS. 2 and 3 are consecutive flowcharts illustrating steps in the image process, and indicates both the process performed by the multifunction peripheral 100 and the process performed by the server 300. The CPU 110 of the multifunction peripheral 100 begins this image process when the user issues a command to the multifunction peripheral 100 to copy an original, for example. The user can input various data including copy commands by operating the operating unit 150 of the multifunction peripheral 100.

In S100 at the beginning of the image process, the read control unit 210 (see FIG. 1) of the multifunction peripheral 100 controls the reading unit 160 to acquire scan data representing the original. Scan data is bitmap data representing colors in red (R), green (G), and blue (B) color component values (256-level gradation values in the first embodiment), for example. Hereinafter, red, green, and blue color component values will be respectively called the R component value, G component value, and B component value. Further, values representing a color will be collectively called a "color value" (for example, the set of R, G, and B component values).

FIG. 4A is a schematic diagram showing a sample image represented by scan data (hereinafter called a "scanned image"). A scanned image 80 in FIG. 3A includes an encircling line object 85 and four illustration objects 81-84: a first object 81, a second object 82, a third object 83, and a fourth object 84. The encircling line object 85 is an object that the user has handwritten on the original using a pen in a predetermined color (red in the first embodiment). As shown in FIG. 4A, the encircling line object 85 intersects both a first object 81 and a second object 82.

FIG. 4 indicates a first direction Dx and a second direction Dy. The scan data representing the scanned image 80 indicates the color of each pixel arranged in gridlines along the directions Dx and Dy. In the following description, the first direction Dx will also be called the +Dx direction, while the direction opposite to the first direction Dx will be called the −Dx direction. Similarly, the second direction Dy will also be called the +Dy direction, while the opposite direction will be called the −Dy direction. In addition, the side relative to the +Dx direction will be simply called the +Dx side, and the same wording will be used for other directions.

In S110 of FIG. 2, the scan data output unit 220 (see FIG. 1) outputs the scan data to the server 300 via the network 500. In S200 the target data acquisition unit 410 (see FIG. 1) of the server 300 acquires the scan data from the multifunction peripheral 100 as image data to be processed (also called "target image data"). The subsequent steps S205-S220 constitute a process for identifying an encircling line in the scanned image 80.

In S205 the first identification unit 411 (see FIG. 1) generates binary image data through a thresholding process on the scan data. Specifically, the first identification unit 411 classifies each of the pixels in the scan data as either a pixel having a color value that specifies the color of the encircling line (red in the first embodiment) or a pixel possessing a color value specifying another color. Pixels having a color value specifying the color of the encircling line will be called candidate pixels, while pixels having other color values will be called non-candidate pixels. The thresholding process is performed based on a prescribed range of colors appropriate for pixels representing an encircling line (hereinafter called the "encircling line color range"). Since the color of the encircling line is assumed to be red in the first embodiment, the encircling line color range may be set to a range of colors in which the R component value is at least a red reference value Rth, the G component value is no greater than a green reference value Gth, and the B component value is no greater than a blue reference value Bth. Pixels having color values that fall within the encircling line color range are classified as candidate pixels, while pixels having color values outside the encircling line color range are classified as non-candidate pixels. Note that the encircling line color may be set to a color other than red, and the encircling line color range may be set to a partial color range that includes the color anticipated to be the color of the encircling line.

FIG. 4B is a schematic diagram showing an example of a binary image 80a represented by the binary image data. The binary image 80a includes two separate candidate regions: a first candidate region 84a and a second candidate region 85a. The first candidate region 84a represents part of the fourth object 84 (FIG. 4A); the second candidate region 85a represents the encircling line object 85 (FIG. 4A). Each of the candidate regions 84a and 85a is configured of a plurality of contiguous candidate pixels. Here, two pixels are considered to be contiguous (i.e., adjacent to each other) when one pixel is positioned within a 3×3 pixel block centered on the other pixel. As an alternative, two pixels may be considered to be contiguous when one pixel is adjacent to the other pixel in one of the four directions +Dx, −Dx, +Dy, and −Dy.

In S210 of FIG. 2, the first identification unit 411 executes a contraction process on the binary image data for contracting the candidate regions, resulting in the generation of contracted binary image data. Next, the first identification unit 411 executes an expansion process on the contracted binary image data for expanding the contracted candidate regions, producing expanded binary image data.

The contraction process is implemented by performing a process for each non-candidate pixel (target pixel) in the binary image data to convert all candidate pixels within a prescribed contraction range of the target pixel to non-candidate pixels, for example. This contraction range may be, for example, a 3×3 (three rows×three columns) range centered on a non-candidate pixel serving as the target pixel. The contraction process serves to change candidate pixels near this non-candidate pixel, i.e., candidate pixels forming the edge of a candidate region, into non-candidate pixels, thereby contracting the candidate region. This process also eliminates small candidate regions produced by noise, i.e., candidate regions configured of only a few candidate pixels (not shown in the drawings).

The expansion process is implemented by performing a process for each candidate pixel (target pixel) in the binary image data to convert all non-candidate pixels within a prescribed expansion range of the target pixel to candidate pixels, for example. The expansion range may be a 5×5 (five rows×five columns) range centered on a candidate pixel serving as the target pixel, for example. Thus, the expansion process changes non-candidate pixels near a candidate pixel, i.e., non-candidate pixels near the edge of a candidate region, to candidate pixels, thereby expanding the candidate region. In addition, breaks in the second candidate region 85a representing the encircling line object 85 (hereinafter called "disconnected parts") may be produced in the contraction process due to noise or thin or faint pen lines (not shown). The expansion process can also connect these disconnected parts.

FIG. 4C is a schematic diagram showing an example of a binary image 80b represented by binary image data that has undergone the contraction and expansion processes. The binary image 80b includes two candidate regions: a first candidate region 84b and a second candidate region 85b. The candidate regions 84b and 85b respectively correspond to the two candidate regions 84a and 85a represented by the binary image 80a of FIG. 3B.

As described above, the contraction and expansion processes serve to eliminate noise and to connect disconnected parts. Accordingly, performing these processes can improve the precision in identifying the encircling lines in an object identification process described later.

The contraction range and the expansion range described above are merely one example of the degree of contraction achieved by the contraction process and the degree of expansion achieved by the expansion process, respectively. When the contraction process is performed prior to the expansion process, the degree of the expansion process (i.e., the size of the expansion range) is preferably larger than the degree of the contraction process (i.e., the size of the contraction range). Setting the ranges to have this relationship can more appropriately connect disconnected parts. However, the expansion process may be executed prior to the contraction process, in which the degree of the expansion process is preferably smaller than the degree of the contraction process. This relationship can more appropriately eliminate candidate regions produced by noise.

In S215 of FIG. 2, the first identification unit 411 performs a labeling process on the binary image data resulting from the contraction and expansion processes to assign discrete identifiers to the separate candidate regions. Specifically, the first identification unit 411 assigns one identifier to each region configured of one or more contiguous candidate pixels (i.e., a candidate region). The first identification unit 411 assigns a different identifier to each of the plurality of separate candidate regions. Thus, the labeling process serves to identify each of the candidate regions. In the example of FIG. 4C, the first identification unit 411 assigns a discrete identifier to each of the first candidate region 84b and the second candidate region 85b. The first identification unit 411 generates first label data representing the results of this labeling process (for example, data correlating pixels with identifiers, also called "labels").

In S220 of FIG. 2, the first identification unit 411 executes the object identification process on the candidate regions identified in S215. The object identification process serves to identify a region representing an encircling line from among the identified candidate regions. For example, when a candidate region has a loop-like shape, the first identification unit 411 determines that this candidate region represents an encircling line. In the example of FIG. 4C, the first identification unit 411 identifies the loop-shaped second candidate region 85b as a region representing an encircling line. Hereinafter, a candidate region representing an encircling line will be called an "encircling line region."

Any of various methods may be used to determine whether a candidate region has a loop shape. Here, one possible method will be described using the example of the binary image 80b in FIG. 4C. In this example, the candidate region being subjected to the determination will be called the "target region"; pixels in the target region will be called "target-region pixels"; and pixels outside the target region will be called "non-target-region pixels." Hence, when the second candidate region 85b is the target region, all pixels included in the second candidate region 85b are target-region pixels, while all pixels not included in the second candidate region 85b are non-target-region pixels. Specifically, the non-target-region pixels include pixels representing the background inside the second candidate region 85b, pixels representing the background outside the second candidate region 85b, and pixels included in the candidate region 84b.

First, the first identification unit 411 identifies a region that includes the edges of the binary image 80b and has a plurality of contiguous non-target-region pixels. The identified region surrounds the entire outer periphery of the target region and will be called a "first peripheral region." When the second candidate region 85b is the target region, the first peripheral region includes every region on the outside of the second candidate region 85b, i.e., the region representing the background on the outer peripheral side of the second candidate region 85b and the entire first candidate region 84b positioned on the outside of the second candidate region 85b.

The region remaining after excluding the first peripheral region from the binary image 80b is the region encircled by the outermost contour of the target region (hereinafter called the "first determination region"). When the second candidate region 85b is the target region, the first determination region is the entire area enclosed by the outermost contour of the second candidate region 85b, i.e., the second candidate region 85b and the region representing background on the inside of the second candidate region 85b.

Next, the first identification unit 411 determines that the target region has a loop-like shape when the first determination region is found to have an area that includes a plurality of contiguous non-target-region pixels. When the second candidate region 85b is the target region, the first identification unit 411 detects an area having a plurality of contiguous non-target-region pixels (the region representing background) within the first determination region (specifically, the area inside of the second candidate region 85b). Accordingly, the first identification unit 411 determines that the second candidate region 85b has a loop shape. When the first identification unit 411 does not detect an area with a plurality of contiguous non-target-region pixels in the first determination region, the first identification unit 411 determines that the target region does not have a loop shape. For example, if the first candidate region 84b is the target region, the first identification unit 411 will determine that the target region does not have a loop shape.

Subsequent steps S225-S247 in FIG. 3 constitute a process for identifying a region representing an object encircled by the encircling line. In S225 the second identification unit 412 selects one encircling region from among those encircling regions identified in S220. The following description will assume that the encircling line region 85b is in FIG. 4C has been selected as the target encircling region.

In S230, the second identification unit 412 acquires partial image data that represent a region encompassing the encircling line region 85b from the scan data. In the first embodiment, the second identification unit 412 uses image data (i.e., scan data) representing the same unaltered rectangular region of the scanned image 80 as the partial image data. However, the second identification unit 412 may instead acquire a portion of the scan data representing a partial region that includes the encircling line region 85b as the partial image data.

In S235 of FIG. 3, the second identification unit 412 generates partial binary image data by performing a thresholding process on the partial image data. More specifically, the second identification unit 412 classifies each of the pixels in the partial image data as either a pixel having a color value denoting the background color (hereinafter called a "background pixel") or a pixel having a color value representing a color other than the background color (hereinafter called an "object pixel").

This thresholding process is performed based on a background color range denoting a range of colors for pixels representing the background. In the first embodiment, the second identification unit 412 calculates a color value representing the background color (hereinafter called the "background color value") to be the average color value of a plurality of pixels in the scanned image 80 of FIG. 4A that neighbor the encircling line region 85b in FIG. 4C. The background color value calculated in S235 includes average values of the R component value, G component value, and B component value called an R average value Rave, a G average value Gave, and a B average value Bave, respectively.

Next, the second identification unit 412 sets a color range of prescribed width centered on the background color value as the background color range. For example, the background color range may be a range of colors: (Rave−W)<R component value<(Rave+W), (Gave−W)<G component value< (Gave+W), and (Bave−W)<background color value<(Bave+ W); where, W is a prescribed value corresponding to width. Note that the background color range is not limited to the range described above, but may be any of various ranges that include colors in the background portions of the scanned image 80. For example, the background color range may be set to a range of colors whose distance from the background color value described above (the Euclidian distance in the RGB color space, for example) is within a prescribed threshold value. Further, the background color value may be calculated according to any of various methods and is not limited to the method described above. For example, the background color value may be set to the average color value of pixels disposed in the edge portion of the scanned image 80. Generally, the second identification unit 412 can analyze the scanned image 80 and implement a thresholding process appropriate for the scanned image 80 by setting a background color range based on the results of this analysis. However, a prescribed range may be employed as the background color range. For example, the background color range may be set to a range of colors whose brightness value computed from the R, G, and B component values is at least a prescribed thresholding value.

FIG. 4D is a schematic diagram showing an example of the partial binary image 80c represented by the partial binary image data. The partial binary image 80c includes three separate object regions 83c, 84c, and 89c. Each of the object regions 83c, 84c, and 89c is configured of a plurality of contiguous object pixels. The first object region 83c represents the third object 83; the second object region 84c represents the fourth object 84; and the third object region 89c represents the entirety of the encircling line object 85, and the first object 81 and second object 82 that intersect the encircling line object 85. Hereinafter, the portion of the third object region 89c that represents the first object 81 will be called a first partial region 81c; the portion that represents the second object 82 will be called a second partial region 82c; and the portion that represents the encircling line object 85 will be called an encircling line partial region 85c. Note that the second identification unit 412 does not perform a process for distinguishing separate object regions (a labeling process, for example). However, the second identification unit 412 can identify object regions representing objects (the three object regions 83c, 84c, and 89c in the example of FIG. 4D) through the thresholding process in step S235.

In S237 of FIG. 3, the third identification unit 413 removes the encircling line region 85b (approximately identical to the encircling line partial region 85c) from object regions represented in the binary image. That is, the third identification unit 413 changes the type of the object pixels identified through the thresholding process of S235 that are included in the target encircling line region (the encircling line region 85b in this case) to background pixels.

FIG. 4E is a schematic diagram showing an example of a partial binary image 80d represented by the partial binary image data produced from the process in S237. In FIG. 4E the encircling line region 85b described with reference to FIG. 4C is depicted with dashed lines. In other words, the partial binary image 80d in FIG. 4E differs from the partial binary image 80c in FIG. 4D in that the encircling line partial region 85c has been removed from the third object region 89c. The portion of the first partial region 81c that overlaps the encircling line region 85b has also been removed. As a result, the first partial region 81c is left with two separate regions: an external partial region 81co on the outer peripheral side of the encircling line region 85b, and an internal partial region 81ci on the inner peripheral side of the encircling line region 85b. In the following description, the external partial region 81co will be called a "first outer candidate region 81co," and the internal partial region 81ci will be called a "first inner candidate region 81ci." Similarly, the portion of the second partial region 82c that overlaps the encircling line region 85b has also been removed. As a result, the second partial region 82c is left with two separate regions: an external partial region 82co on the outside of the encircling line region 85b, and an internal partial region 82ci on the inside of the encircling line region 85b. Hereinafter, the external partial region 82co will be called a "second outer candidate region 82co," and the internal partial region 82ci will be called a "second inner candidate region 82ci." The first object region 83c and second object region 84c remain unchanged in the partial binary image 80d.

In S240 of FIG. 3, the third identification unit 413 performs a labeling process on the partial binary image data. The steps in the labeling process are identical to those in the labeling process of S215. In the example of FIG. 4E, the third identification unit 413 assigns a unique identifier to each of the six separate object regions 81ci, 81co, 82ci, 82co, 83c, and 84c. The third identification unit 413 generates second label data representing the results of this labeling process (for example, data correlating pixels with identifiers).

The object regions 81ci, 81co, 82ci, 82co, 83c, and 84c identified by the third identification unit 413 represent objects other than the encircling line object 85. As will be described later, the extraction unit 420 extracts regions from among these object regions that represent objects encircled by the encircling line object 85. Thus, object regions identified by the third identification unit 413 are candidates for object regions to be extracted by the extraction unit 420. Therefore, object regions identified by the third identification unit 413 will be called "candidate object regions" in the following description.

Figure 5:
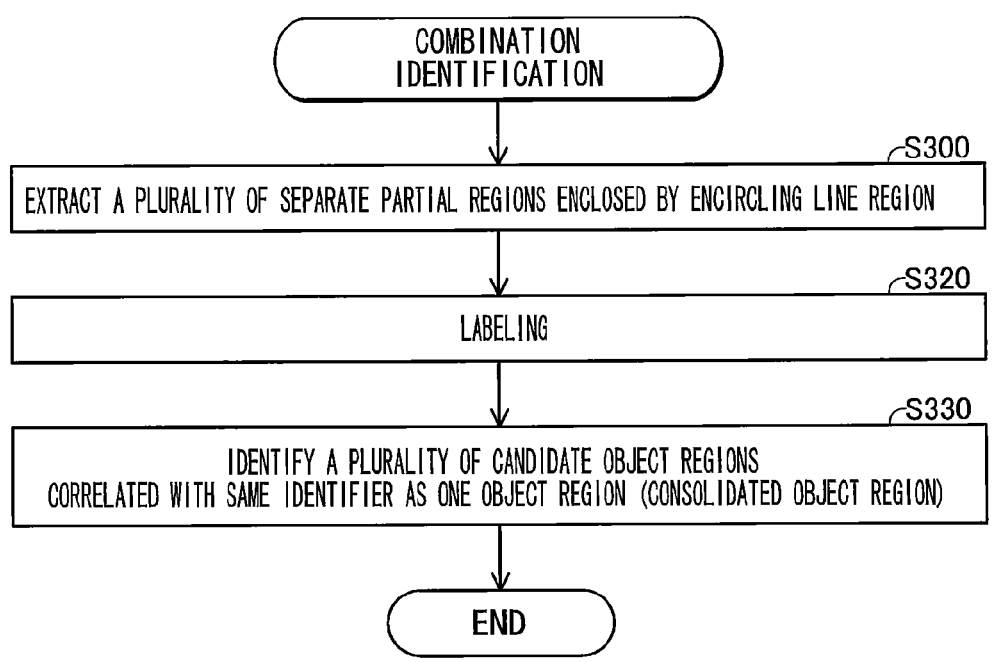
FIG. 5 is a flowchart illustrating steps in a combination identification process.

In S242 of FIG. 3, the contact extraction unit 422 of the extraction unit 420 executes a combination identification process to identify combinations of candidate object regions that were separated when an encircling line region was removed. FIG. 5 is a flowchart illustrating steps in the combination identification process. In S300 at the beginning of the process in FIG. 5, the contact extraction unit 422 uses a prescribed grid pattern to extract a plurality of separate partial regions from the encircling line region selected as the process target (the encircling line region 85b of FIG. 4C in this case).

Figure 6A:
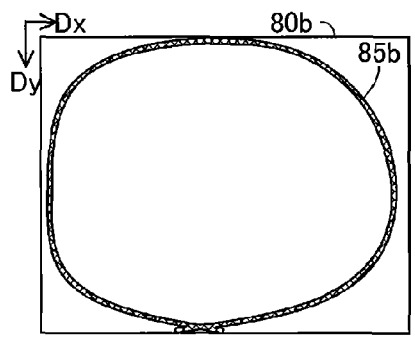
FIGS. 6A-6E are schematic diagrams illustrating the combination identification process.
Figure 6B:
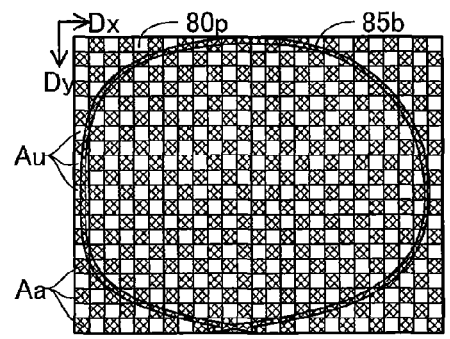

FIGS. 6A-6E are a schematic diagram illustrating the combination identification process. FIG. 6A shows the encircling line region 85b, and FIG. 6B shows an example of a prescribed grid pattern 80p. The grid pattern 80p is configured of rectangular valid partial areas Aa, and invalid partial areas Au having the same shape as the valid partial areas Aa that are alternated in a grid pattern. The valid partial areas Aa have been shaded in FIG. 6B. As shown in the drawing, the valid partial areas Aa and invalid partial areas Au are arranged alternately along both the first direction Dx and the second direction Dy.

In FIG. 6B, the encircling line region 85b is superimposed over the grid pattern 80p. With the encircling line region 85b superimposed over the grid pattern 80p, the contact extraction unit 422 extracts partial regions from the encircling line region 85b that fall in the valid partial areas Aa. For example, pixels in the encircling line region 85b overlapping the valid partial areas Aa are maintained as extracted pixels in the binary image, while pixels overlapping the invalid partial areas Au are changed to non-extracted pixels in the binary image. Alternatively, any of various methods may be employed to determine the position of the grid pattern $80p$ relative to the encircling line region $85b$. For example, the position of the grid pattern $80p$ relative to the scanned image $80$ may be preset. In this case, the contact extraction unit $422$ identifies the position of the grid pattern $80p$ by referring to this preset position.

Figure 6C:
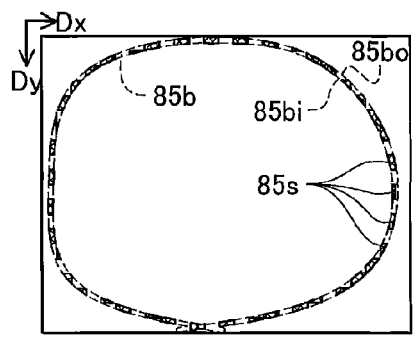

FIG. 6C is a schematic diagram showing an example of extracted partial regions $85s$. As shown in the drawing, a plurality of partial regions $85s$ has been extracted. As shown in FIG. 6B, a single valid partial area Aa or invalid partial area Au is sufficiently small that the encircling line region $85b$ overlaps the multiple valid partial areas Aa and the invalid partial areas Au. Therefore, a plurality of isolated partial regions $85s$ is extracted from the encircling line region $85b$, as shown in FIG. 6C. As shown in FIG. 6B, the valid partial areas Aa and the invalid partial areas Au are laid out uniformly across the entire encircling line region $85b$. Hence, the partial regions $85s$ are distributed more or less evenly over the entire encircling line region $85b$, as shown in FIG. 6C. Further, as shown in FIG. 6B, the single valid partial area Aa or the invalid partial area Au is larger than the line width of the encircling line region $85b$. Hence, partial regions $85s$ extending from the inner peripheral edge to the outer peripheral edge of the encircling line region $85b$ are extracted from the encircling line region $85b$, as shown in FIG. 6C. Here, the width of the encircling line is the width of a line drawn with a prescribed pen and is preset based on the resolution of the scanned image (i.e., the pixel density). Further, the partial regions $85s$ are extracted such that partial regions $85s$ are arranged alternately with regions that are not partial regions $85s$ along the encircling line. Hereinafter, the partial regions $85s$ will also be referred to as "unconnected partial regions $85s$."

Figure 6D:
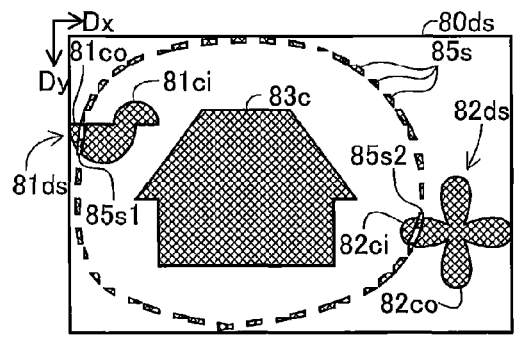

Next, the contact extraction unit $422$ generates binary image data representing a binary image obtained by superimposing the unconnected partial regions $85s$ in FIG. 6C over the partial binary image $80d$ in FIG. 4E (hereinafter called a "binary consolidating image"). FIG. 6D is a schematic diagram showing part of a binary consolidating image $80ds$. The binary consolidating image $80ds$ differentiates pixels included in either the candidate object regions represented by the partial binary image $80d$ in FIG. 4E or the newly extracted unconnected partial regions $85s$ from all other pixels. Thus, FIG. 6D shows candidate object regions $81ci$, $81co$, $82ci$, $82co$ and $83$, and a plurality of unconnected partial regions $85s$.

As shown in FIG. 6D, a first unconnected partial region $85s1$ is arranged between the first outer candidate region $81co$ and first inner candidate region $81ci$. Thus, these candidate object regions $81co$ and $81ci$ are both in contact with the first unconnected partial region $85s1$. In addition, a second unconnected partial region $85s2$ is arranged between the second outer candidate region $82co$ and the second inner candidate region $82ci$. Thus, these candidate object regions $82ci$ and $82co$ both contact the second unconnected partial region $85s2$. By extracting an inner candidate region and an outer candidate region that commonly contact an unconnected partial region $85s$, it is possible to extract an inner candidate region and an outer candidate region that confront each other through the encircling line region $85b$. In the example of FIG. 6D, none of the unconnected partial regions $85s$ contact the first object region $83c$ and, while not shown in the drawing, none of the unconnected partial regions $85s$ contact the second object region $84c$ (see FIG. 4E).

In S320 of FIG. 5, the contact extraction unit $422$ performs a labeling process on the binary image data representing the binary consolidating image $80ds$. The steps in this labeling process are identical to those in the labeling process in S215 of FIG. 2. In the example of FIG. 6D, the contact extraction unit $422$ assigns a common identifier to a continuous region $81ds$ that includes the first inner candidate region $81ci$, the first outer candidate region $81co$, and the first unconnected partial region $85s1$. Similarly, the contact extraction unit $422$ assigns a common identifier to a continuous region $82ds$ that includes the second inner candidate region $82ci$, the second outer candidate region $82co$, and the second unconnected partial region $85s2$. Since the two regions $81ds$ and $82ds$ are separated from each other, different identifiers are assigned to the regions $81ds$ and $82ds$. The contact extraction unit $422$ generates third label data representing the results of this labeling process (for example, data correlating pixels with identifiers).

Figure 6E:
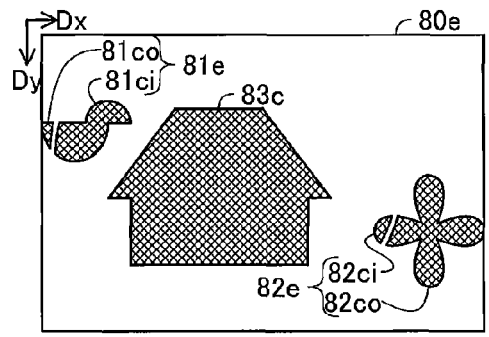

In S330 of FIG. 5, the contact extraction unit $422$ identifies a plurality of the candidate object regions represented by the partial binary image $80d$ in FIG. 4(E) that were correlated with the same identifier in S320 as a single object region (hereinafter called a "consolidated object region"). FIG. 6E is a schematic diagram showing a consolidated object region $80e$. The example of FIG. 6E indicates five candidate object regions $81ci$, $81co$, $82ci$, $82co$, and $83c$. The contact extraction unit $422$ identifies the first outer candidate region $81co$ and first inner candidate region $81ci$ as a single consolidated object region $81e$ (hereinafter referred to as the "first consolidated object region $81e$"). The contact extraction unit $422$ also identifies the second outer candidate region $82co$ and the second inner candidate region $82ci$ as a single consolidated object region $82e$ (hereinafter referred to as the "second consolidated object region $82e$"). The contact extraction unit $422$ generates consolidated object data representing the identified consolidated object regions. For example, the contact extraction unit $422$ assigns a unique identifier to each consolidated object region and generates consolidated object data representing correlations between the identifiers of the candidate object regions and the identifier of its corresponding consolidated object region.

Completing the process in S330 ends the process of FIG. 5, and specifically step S242 of FIG. 3. In S245 of FIG. 3, the inclusion extraction unit $424$ of the extraction unit $420$ determines whether any of the candidate object regions (FIG. 4E) other than the encircling line region $85b$ (FIG. 4C) is enclosed by the encircling line region $85b$. For example, when the candidate object region overlaps the region inside the encircling line region $85b$ (the inner peripheral region $85bi$ in this example), the inclusion extraction unit $424$ determines that the candidate object region is enclosed by the encircling line region $85b$. In the example of FIG. 4E, each of the three candidate object regions $81ci$, $82ci$, and $83c$ overlaps the inner peripheral region $85bi$. Therefore, the inclusion extraction unit $424$ determines that each of the candidate object regions $81ci$, $82ci$, and $83c$ is enclosed by the encircling line region $85b$. The other three candidate object regions $81co$, $82co$, and $84c$ do not overlap the inner peripheral region $85bi$, but overlap the region outside the encircling line region $85b$ (the outer peripheral region $85bo$ in this example). Therefore, the inclusion extraction unit $424$ determines that each of the candidate object regions $81co$, $82co$, and $84c$ is not enclosed by the encircling line region $85b$. The inclusion extraction unit $424$ also generates inclusion relation data representing these determination results (for example, data expressing correlations between identifiers of the candidate object regions and flags indicating whether the regions are enclosed by the encircling line region 85b).

Note that any of various methods may be employed to determine whether a candidate object region overlaps the region inside the encircling line region 85b (the inner peripheral region 85bi in this example). Here, one possible method will be described using the example of the binary image 80b in FIG. 4C and the partial binary image 80d in FIG. 4E. In this description, pixels included in the encircling line regions will be called "encircling-line pixels," and pixels other than the encircling-line pixels will be called "non-encircling-line pixels." In the example of FIGS. 4C and 4D, pixels included in the encircling line region 85b are encircling-line pixels, while pixels other than the pixels in the encircling line region 85b are non-encircling-line pixels. That is, the non-encircling-line pixels include pixels representing the background inside the encircling line region 85b, pixels representing the background outside the encircling line region 85b, and all candidate object regions 81co, 81ci, 82co, 82ci, 83c, and 84c other than the encircling line region 85b.

First, the inclusion extraction unit 424 identifies a region that includes the edges of the partial binary image 80d and is configured of a plurality of contiguous non-encircling-line pixels. The identified region surrounds the outer peripheral side of the encircling line region 85b, i.e., the outer peripheral region 85bo in this example, and is hereinafter called the "second peripheral region." Specifically, the second peripheral region is the entire outer peripheral side of the encircling line region 85b. That is, the entire region represents two types of regions: the background on the outer peripheral side of the encircling line region 85b; and the candidate object regions 81co, 82co, and 84c disposed on the outer peripheral side of the encircling line region 85b.

The region of the partial binary image 80d other than the second peripheral region is enclosed by the outermost contour of the encircling line region 85b and is hereinafter called the "second determination region." Specifically, the second determination region is the entire encircling line region 85b and inner peripheral region 85bi. That is, the inner peripheral region 85bi includes some regions: the region representing the background on the inside of the encircling line region 85b; and the candidate object regions 81ci, 82ci, and 83c disposed inside the encircling line region 85b.

When the inclusion extraction unit 424 detects pixels of a candidate object region in the second determination region, the inclusion extraction unit 424 determines that the candidate object region overlaps the inner peripheral region 85bi, i.e., that the candidate region is enclosed by the encircling line. In this example, the inclusion extraction unit 424 detects pixels for the three candidate object regions 81ci, 82ci, and 83c in the second determination region. Hence, the inclusion extraction unit 424 determines that the candidate object regions 81ci, 82ci, and 83c are enclosed by the encircling line region 85b (i.e., the encircling line object 85). If the inclusion extraction unit 424 does not detect a pixel from a candidate object region in the second determination region, then the inclusion extraction unit 424 determines that the candidate object region does not overlap the inner peripheral region 85bi, i.e., that the candidate region is not enclosed by the encircling line region 85b. In this example, the inclusion extraction unit 424 does not detect a pixel from the three candidate object regions 81co, 82co, and 84c in the second determination region; hence, the inclusion extraction unit 424 determines that the candidate object regions 81co, 82co, and 84c are not enclosed by the encircling line region 85b.

In S246 of FIG. 3, the inclusion extraction unit 424 extracts enclosed object regions. An enclosed object region is a region representing an object that is entirely surrounded by the inner peripheral side of the encircling line object 85. In the first embodiment, the inclusion extraction unit 424 extracts those candidate object regions that do not constitute a consolidated object region and are found to be enclosed by the encircling line region 85b as enclosed object regions. In the example of FIG. 4E, the inclusion extraction unit 424 extracts the first object region 83c as an enclosed object region.

In this way, the inclusion extraction unit 424 identifies enclosed object regions representing objects surrounded entirely by the encircling line object 85.

Figure 7:
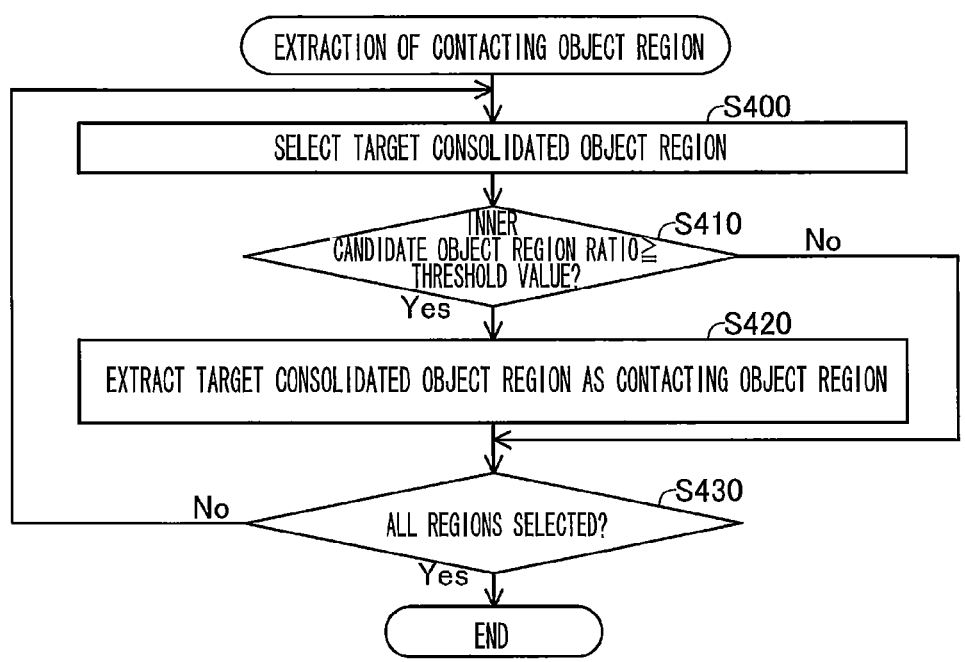
FIG. 7 is a flowchart illustrating steps in a process for extracting contacting object regions.

In S247 of FIG. 3, the contact extraction unit 422 of the extraction unit 420 extracts contacting object regions. A contacting object region represents an object that abuts an encircling line and that is to be processed as an object selected by the encircling line. FIG. 7 is a flowchart illustrating steps in the process for extracting contacting object regions. In S400 at the beginning of the process in FIG. 7, the contact extraction unit 422 selects one of the consolidated object regions identified in S330 of FIG. 5 that has not yet been processed (for example, the first consolidated object region 81e in FIG. 6E, which includes the first outer candidate region 81co and first inner candidate region 81ci) as the target consolidated object region. In S410 the contact extraction unit 422 determines whether the ratio of inner candidate object regions (the first inner candidate region 81ci in the example of FIG. 6E) to the entire target consolidate object region (the first outer candidate region 81co and first inner candidate region 81ci in the example of FIG. 6E) is at least a prescribed threshold value. The ratio here should have a positive correlation with a ratio of area. In the first embodiment, the ratio is computed as the ratio of pixels. The threshold value may be set to any value greater than 0% and less than 100%. The threshold value is set to 50% in the embodiment.

When the ratio is at least the threshold value (S410: YES), in S420 the contact extraction unit 422 extracts the current target consolidated object region as one contacting object region, and advances to S430. However, if the ratio is less than the threshold value (S410: NO), the contact extraction unit 422 skips step S420 and advances directly to S430.

In S430 the contact extraction unit 422 determines whether the above process has been performed for all consolidated object regions. When there remain consolidated object regions that have not been processed (S430: NO), the contact extraction unit 422 returns to S400 and repeats the above process on an unprocessed consolidated object region. Once all consolidated object regions have been processed (S430: YES), the contact extraction unit 422 ends the process of FIG. 7.

FIG. 4F is a schematic diagram showing an extracted contacting object region and the enclosed object region. As shown in the drawing, the first consolidated object region 81e has been extracted as the contacting object region, but the second consolidated object region 82e (see FIG. 6E) has not been extracted as a contacting object region. In addition, the first object region 83c has been extracted as an enclosed object region. The contacting object region and the enclosed object region are processed as regions representing objects selected by the encircling line. As will be described later, objects selected by an encircling line are removed in the first embodiment.

S248 of FIG. 3 is a color correction process for correcting the color in gap regions of the scanned image 80. A gap region is an area between a plurality of candidate object regions constituting a consolidated object region. In the example of FIG. 6E, the area between the second inner candidate region 82*ci* and the second outer candidate region 82*co* is a gap region. In the first embodiment, the color modification unit 430 corrects the color of gap regions found only in those consolidated object regions identified in S330 of FIG. 5 that are not to be removed.

Figure 8:
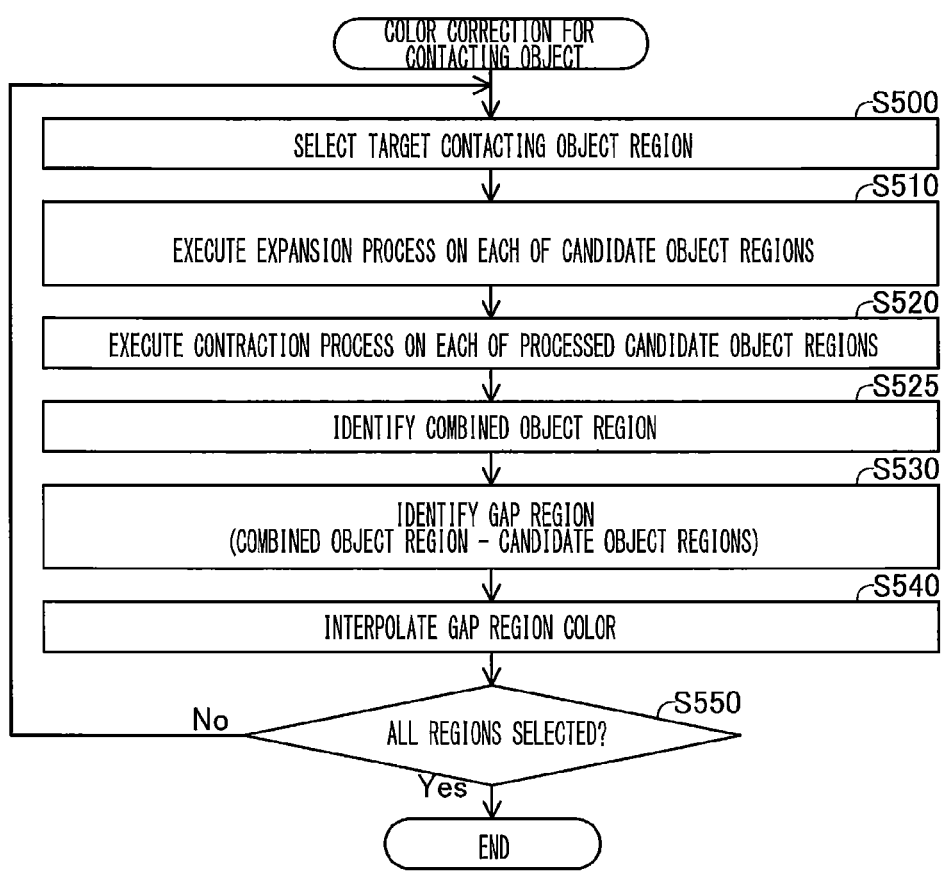
FIG. 8 is a flowchart illustrating steps in a color correction process for gap regions.
Figure 9A:
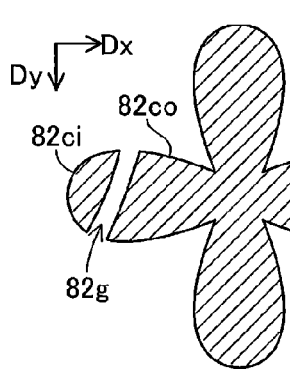
FIGS. 9A-9E are schematic diagrams illustrating the color correction process for gap regions.

FIG. 8 is a flowchart illustrating steps in the color correction process for gap regions. In S500 at the beginning of the process in FIG. 8, the color modification unit 430 selects one unprocessed consolidated object region from among the regions that are not being removed as the target consolidated object region (hereinafter simply referred to as the "target consolidated region"). FIGS. 9A-9E are a schematic diagram illustrating the color correction process for gap regions. FIG. 9A shows an example of a target consolidated region. Here, the second consolidated object region 82*e* is used as the target consolidated region. As shown in the drawing, a gap region 82*g* is formed between the second inner candidate region 82*ci* and second outer candidate region 82*co* constituting the second consolidated object region 82*e*. Hereinafter, the process in FIG. 8 will be described under the assumption that the second consolidated object region 82*e* has been selected as the target consolidated region.

Figure 9B:
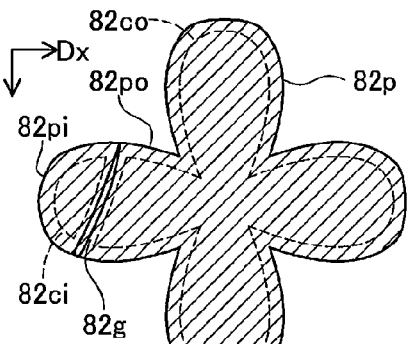

In S510 of FIG. 8, the region consolidation unit 425 executes an expansion process on the plurality of candidate object regions constituting the target consolidated region to expand the dimensions of the candidate object regions. The steps in this expansion process are identical to those in the process described in S210 of FIG. 2. FIG. 9B shows the candidate object regions produced from this expansion process. Expanding the second outer candidate region 82*co* forms a second expanded outer candidate region 82*po*, and expanding the second inner candidate region 82*ci* forms a second expanded inner candidate region 82*pi*. The second expanded outer candidate region 82*po* and second expanded inner candidate region 82*pi* are in contact with each other, filling in the gap region 82*g*. Hereinafter, the continuous region that includes the second expanded outer candidate region 82*po* and second expanded inner candidate region 82*pi* will be called the "expanded candidate region 82*p*."

Note that the degree of expansion implemented in the expansion process of S510 is preset to be large enough that the expanded candidate object regions can fill in the gap regions produced when encircling line regions are removed.

In S520 of FIG. 8, the region consolidation unit 425 executes a contraction process on the candidate object regions produced from the expansion process, and specifically on the expanded candidate region 82*p* in this example, in order to contract the dimensions of the candidate object regions. The steps in the contraction process are the same in those in the contraction process described for S210 of FIG. 2. However, the degree of contraction produced in the contraction process of S520 is set to the same degree as the expansion process of S510.

Figure 9D:
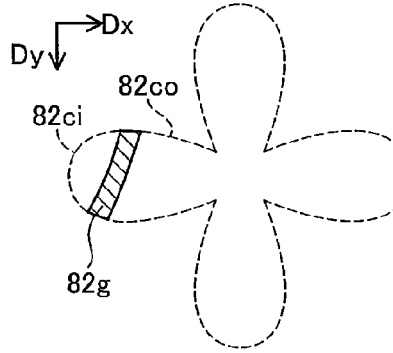
Figure 9C:
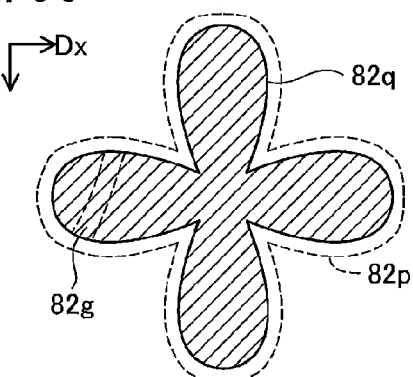

FIG. 9C shows the candidate object regions produced from the contraction process. Contracting the expanded candidate region 82*p* produces a contracted candidate region 82*q*. Since the expanded candidate region 82*p* on which the contracted candidate region 82*q* is based filled the gap region 82*g*, the contracted candidate region 82*q* also fills the gap region 82*g*. As described above, the degree of contraction in the contraction process of S520 is set to be the same as the degree of expansion in the expansion process of S510. Therefore, the contours of the contracted candidate region 82*q* closely match the contours of the second inner candidate region 82*ci* and the second outer candidate region 82*co* (excluding the area around the gap region 82*g*).

In S525 of FIG. 8, the region consolidation unit 425 identifies the region joined through the expansion process of S510 and the contraction process of S520 as a combined object region. In the example of FIG. 9C, the region consolidation unit 425 identifies the contracted candidate region 82*q* as the combined object region (hereinafter referred to as the "combined object region 82*q*"). More specifically, the region consolidation unit 425 performs the expansion process of S510 and the contraction process of S520 on binary image data representing a target consolidated region, such as the second consolidated object region 82*e* in FIG. 9A. In S525, the region consolidation unit 425 executes a labeling process on the binary image data resulting from the expansion and contraction processes. In this way, the region consolidation unit 425 can identify the combined object region. Through this process, the region consolidation unit 425 generates fourth label data representing the results of the labeling process (for example, data representing correlations between pixels and flags indicating whether the pixels are included in the combined object region).

In S530 of FIG. 8, the color modification unit 430 identifies the gap region 82*g* by removing the second inner candidate region 82*ci* and second outer candidate region 82*co* from the combined object region 82*q*. That is, the color modification unit 430 removes pixels included in the second inner candidate region 82*ci* and the second outer candidate region 82*co* from the pixels included in the combined object region 82*q*, and uses the region configured of the remaining pixels as the gap region 82*g*. FIG. 9D is a schematic diagram showing the identified gap region 82*g*. As shown, the region between the second inner candidate region 82*ci* and second outer candidate region 82*co* has been identified as the gap region 82*g*.

Figure 9E:
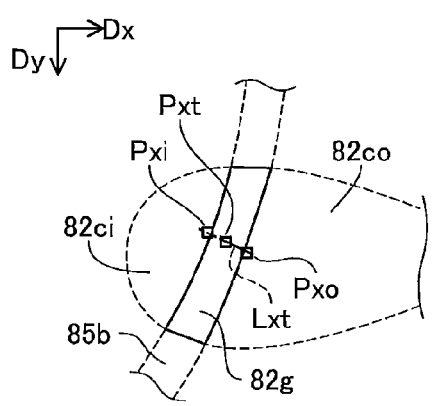

In S540 of FIG. 8, the color modification unit 430 corrects color values for pixels in the gap region 82*g* of the scanned image 80 (see FIG. 4A). FIG. 9E is a schematic diagram illustrating this process of correcting color values. The drawing in FIG. 9E shows the gap region 82*g*, the second inner candidate region 82*ci*, part of the second outer candidate region 82*co*, and part of the encircling line region 85*b*. The portion of the second outer candidate region 82*co* shown in the drawing is the part that contacts the encircling line region 85*b*, i.e., the gap region 82*g*. The portion of the encircling line region 85*b* shown in the drawing is the portion that includes the gap region 82*g*.

In the color correction process, the color modification unit 430 sets the color value of a pixel Pxt in the gap region 82*g* (hereinafter called the "target pixel Pxt") using the color value of a pixel Pxi in the second inner candidate region 82*ci* (hereinafter called the "inner pixel Pxi") and the color value of a pixel Pxo in the second outer candidate region 82*co* (hereinafter called the "outer pixel Pxo").

For the inner pixel Pxi, the color modification unit 430 employs the pixel in the second inner candidate region 82*ci* that is closest to the target pixel Pxt, for example. Next, the color modification unit 430 identifies a line Lxt that passes through the target pixel Pxt and inner pixel Pxi. The line Lxt chosen in this way is substantially orthogonal to the longitudinal direction of the encircling line region 85*b* (and hence, the longitudinal direction of the encircling line object 85). For the outer pixel Pxo, the color modification unit 430 similarly employs the pixel in the second outer candidate region 82*co* that overlaps the line Lxt and is closest to the target pixel Pxt. Next, the color modification unit 430 calculates the color value of the target pixel Pxt by performing a linear interpolation on the color values of the inner pixel Pxi and outer pixel Pxo. Thus, the color modification unit 430 can calculate a suitable color value for the target pixel Pxt based on the color of the second inner candidate region 82*ci* and the color of the second outer candidate region 82*co*.

Here, it is assumed that a single pixel has a rectangular shape with two sides parallel to the first direction Dx and two sides parallel to the second direction Dy. Thus, a pixel overlaps the line Lxt when a rectangle representing the pixel overlaps the line Lxt. The dimension of a single pixel in the first direction Dx is the same as the distance between adjacent pixels along the first direction Dx, and the dimension of a single pixel in the second direction Dy is the same as the distance between adjacent pixels along the second direction Dy. Here, the line Lxt is a line passing through the center of the target pixel Pxt and the center of the inner pixel Pxi. Further, the Euclidian distance between the centers of pixels may be used to determine distance, and specifically the distance between two pixels, in the above calculations.

The color modification unit 430 calculates the corrected color value for all pixels in the gap region 82*g* according to the above method. After completing all color value calculations, in S550 the color modification unit 430 determines whether any of the consolidated object regions that were not removed still remain to be processed. If there remain any unprocessed consolidated object regions (S550: NO), the color modification unit 430 returns to S500 and repeats the above process on a consolidated object region that has yet to be processed. Once all consolidated object regions have been processed (S550: YES), the color modification unit 430 ends the process in FIG. 8 and, hence, ends step S248 of FIG. 3.

S250 of FIG. 3 is a process for correcting the color of the encircling line regions in order to erase the encircling lines. The ensuing step S255 is a process for removing objects surrounded by encircling lines (i.e., selected objects) from the scanned image 80. FIG. 4G is a schematic diagram showing an example of a processed image 90. The processed image 90 is an image represented by the processed data generated by executing the processes in steps S248, S250, and S255 on the scan data. As shown in FIG. 4G, the processed image 90 is obtained by removing the encircling line object 85, and the first object 81 and third object 83 encircled (i.e., selected) by the encircling line object 85 from the scanned image 80. Although the encircling line object 85 intersects the second object 82, the second object 82 has not been removed because the portion of the second object 82 on the inside of the encircling line object 85 was less than the threshold value (S410: NO). Further, the color of the portion of the second object 82 overlapping the encircling line object 85 has been corrected in S248 of FIG. 3.

More specifically, in S250 of FIG. 3 the object process unit 440 changes the color values of pixels in the scanned image 80 that fall in the encircling line region 85*b* represented by the binary image 80*b* to the background color value. The background color value was calculated in S235 described above. Consequently, the region of the scanned image 80 that represented the encircling line object 85 now represents background. Pixels in gap regions that were processed in S248 are excluded from the process in S250.

In S255 the object process unit 440 changes the color values of pixels in the scanned image 80 that fall in object regions selected by encircling lines (i.e., the enclosed object regions and contacting object regions). The background color value is the same value calculated in S235 described above. By performing this process, the region representing the first object 81 and third object 83 in the scanned image 80 now represents background.

In S260 of FIG. 2, the second identification unit 412 determines whether the above process has been completed for all encircling line regions. If there remain any unprocessed encircling line regions (S260: NO), the second identification unit 412 returns to S225 and performs the above process on an unprocessed encircling line region.

Each of the processes in S248, S250 and S255 is performed successively on scan data representing the scanned image 80. The processed image data obtained by completing the processes on all encircling line regions is used as the final processed data.

When the process has been completed for all encircling line regions (S260: YES), in S265 the processed data output unit 450 outputs the processed data to the multifunction peripheral 100 via the network 500. In S120 the processed data acquisition unit 230 of the multifunction peripheral 100 then acquires the processed data from the server 300. In S130 the print control unit 240 generates print data based on the processed data and supplies this print data to the printing unit 170. The printing unit 170 prints an image based on the print data received from the print control unit 240.

As described above, the contact extraction unit 422 in the first embodiment extracts a region including an inner candidate object region and an outer candidate object region (such as the first consolidated object region 81*e* in FIG. 6E that includes the first inner candidate region 81*ci* and the first outer candidate region 81*co*) as a contacting object region that represents an object abutting an encircling line when the following three conditions are met (S242, S245, and S247 of FIG. 3).

First Condition: A candidate object region identified by the third identification unit 413 includes an inner candidate object region disposed inside of the encircling line region, and an outer candidate object region disposed outside of the encircling line region (S242 of FIG. 3, S330 of FIG. 5).

Second Condition: The inner candidate object region and the outer candidate object region both contact the encircling line region and confront each other across the encircling line region (S242 of FIG. 3, S330 of FIG. 5).

Third Condition: The ratio of the inner candidate object region to the sum of the inner candidate object region and the outer candidate object region is at least a prescribed threshold value (S247 of FIG. 3, S410 of FIG. 7).

The first condition is satisfied when the candidate object regions identified by the contact extraction unit 422 include the inner candidate object region and the outer candidate object region. When an encircling line region intersects a region representing a single object, the contact extraction unit 422 identifies the inner candidate object region disposed on the inner peripheral side of the encircling line region, and the outer candidate object region disposed on the outer peripheral side of the encircling line region. A consolidated object region that serves as a candidate for a contacting object region in the first embodiment is configured of a plurality of candidate object regions abutting a common unconnected partial region (FIGS. 6D and 6E). Normally, a plurality of candidate object regions having these characteristics will include an inner candidate object region disposed on the inner peripheral side of the encircling line region and an outer candidate object region disposed on the outer peripheral side of the encircling line region. Hence, the condition for extracting contacting object regions in the first embodiment can be assumed to include the first condition.

The second condition is satisfied when the inner candidate object region and the outer candidate object region contact an encircling line region and oppose each other across this region. When an encircling line region intersects a region representing a single object, the intersection of the encircling line region forms the inner candidate object region and the outer candidate object region from the region representing the single object, and these inner and outer candidate object regions will oppose each other through the encircling line region, thereby satisfying the second condition. This condition reduces the likelihood that the contact extraction unit 422 will extract an inner candidate object region and outer candidate object region that are far apart from each other (that is, candidate object regions representing different objects) as contacting object regions. The prescribed positional relationship of the second condition in the first embodiment stipulates that the inner candidate object region and the outer candidate object region abut a common unconnected partial region, as illustrated in FIG. 6.

The third condition serves to identify object intentionally surrounded by encircling lines. If an encircling line intersecting an object was not intended to intersect the object, the probability is high that the ratio of the inner candidate object region will be less than the prescribed threshold value. Therefore, the third condition reduces the likelihood that the contact extraction unit 422 will extract an inner candidate object region and outer candidate object region representing an object unintentionally intersected by an encircling line as contacting object regions. Accordingly, use of the third condition as a condition of extraction can reduce the likelihood that the extraction unit 420 will extract a region representing an object unintentionally intersected by an encircling line as a contacting object region. As a result, the contact extraction unit 422 can more suitably process objects overlapped by encircling lines.

As described with reference to FIGS. 8 and 9, the region consolidation unit 425 identifies a combined object region configured of the inner candidate object region and the outer candidate object region that have been joined through expansion and contraction processes. In the example of FIG. 9, the region consolidation unit 425 identifies the combined object region 82$q$ produced from the second inner candidate region 82$ci$ and second outer candidate region 82$co$. In this way, when a region representing a single object is separated by an encircling line into an inner candidate object region and an outer candidate object region, the region consolidation unit 425 can identify the combined object region formed by joining these candidate object regions, and can thereby suitably process an object that is overlapped by an encircling line. For example, as described with reference to FIGS. 8 and 9 in the embodiment, the color modification unit 430 uses the combined object region, the inner candidate object region, and the outer candidate object region to identify a gap region (the gap region 82$g$ in the example of FIG. 9). Thereafter, the color modification unit 430 changes the color of the gap region 82$g$ based on the colors of the inner candidate object region and the outer candidate object region.

Further, as described with reference to FIGS. 5 and 6, the contact extraction unit 422 extracts a plurality of unconnected partial regions from an encircling line region and uses the inner candidate object regions and the outer candidate object regions that contact a common unconnected partial region as the candidate object regions satisfying the second condition. Using the example of FIG. 6D, the contact extraction unit 422 identifies the second inner candidate region 82$ci$ and the second outer candidate region 82$co$ that contact a common second unconnected partial region 85$s$2 as the second consolidated object region 82$e$. Therefore, in the process of FIG. 7 the contact extraction unit 422 selects contacting object regions from the identified consolidated object region. Accordingly, the contact extraction unit 422 can suitably process the inner and outer candidate object regions representing a single object that was intersected by an encircling line.

As described with reference to FIG. 6, the contact extraction unit 422 uses partial regions of the encircling line region 85$b$ that fall within the valid partial areas Aa constituting the prescribed grid pattern 80$p$ as the unconnected partial regions 85$s$. Accordingly, the contact extraction unit 422 can easily extract a plurality of unconnected partial regions from the encircling line region. Further, the grid pattern 80$p$ shown in FIGS. 6A-6E are configured of the plurality of valid partial areas Aa and the plurality of invalid partial areas Au arranged alternatingly in a grid pattern. Consequently, the contact extraction unit 422 can suitably extract a plurality of unconnected partial regions from encircling line regions having various shapes.

When generating or acquiring data such as scan data, processed data, and print data, the process units 210, 220, 230, and 240 of the multifunction peripheral 100 (and specifically the CPU 110) store this data in a storage device such as the volatile storage device 120. The process units 210, 220, 230, and 240 subsequently acquire data needed for processes by referencing the data stored in the storage device.

Similarly, when generating or acquiring data such as scan data, binary image data, label data, consolidated object data, inclusion relation data, and processed data, the process units 410, 411, 412, 413, 420 (422 and 424), 425, 430, 440, and 450 of the server 300 (and specifically, the CPU 310) store this data in a storage device such as the volatile storage device 320. The process units 410, 411, 412, 413, 420 (422 and 424), 425, 430, 440, and 450 subsequently acquire data needed for processes by referencing the data stored in the storage device.

B. Modification of the Embodiment (1) The prescribed positional relationship of the second condition described above in which regions oppose each other across an encircling line region is not limited to a positional relationship identified using the unconnected partial region 85$s$ (FIG. 6), but may be any of various positional relationships in which an encircling line region interposes between an inner candidate object region and an outer candidate object region. For example, the positional relationship of the second condition may be satisfied when the shortest distance between an inner candidate object region and an outer candidate object region is no greater than a prescribed threshold value. The threshold value in this case may be a length equivalent to or slightly larger than the line width of the encircling line region (for example, a range of lengths between 1 and 2 times the line width of the encircling line region). The prescribed positional relationship may be a relationship that is satisfied when the expanded inner and outer candidate object regions produced from a prescribed expansion process contact each other, as in the example of the second inner candidate region 82$ci$ and the second outer candidate region 82$co$ of FIG. 9.

(2) The conditions for extracting contacting object region with the contact extraction unit 422 (hereinafter referred to as "extraction conditions") are not limited to the first, second, and third conditions described above, but may be various other conditions. For example, the extraction conditions may include a fourth condition stipulating that the difference between the color values of the inner candidate object region and the outer candidate object region be no greater than a prescribed threshold value. This fourth condition can reduce the likelihood that the contact extraction unit 422 will extract inner and outer candidate object regions representing different objects as a single contacting object region. Here, the color value of a candidate object region may be any of various representative values calculated from a plurality of pixels in the candidate object region (for example, the average, mode, or median). For example, the contact extraction unit 422 may compute brightness values from the R, G, and B component values and use the difference of those brightness values.

In order to extract an inner candidate object region and outer candidate object region representing a single object intersected by an encircling line as a single contacting object region, it is generally preferable to include the first and second conditions described above in the extract conditions. The contact extraction unit 422 may extract inner and outer candidate object regions that satisfy the first and second conditions as a contacting object region, even when the third condition is not met.

(3) Contacting object regions extracted by the contact extraction unit 422 are not limited to regions that include both inner and outer candidate object regions, but may be regions that include an inner candidate object region but not an outer candidate object region.

(4) The expansion process performed on a target region (a candidate object region, for example) is not limited to the process described in S210 of FIG. 2 and S510 of FIG. 8, but may be any of various processes for expanding the dimensions of a target region, including the following process. In the following description, a pixel included in the target region will be called a "region pixel," while a pixel not included in the target region will be called a "non-region pixel." In this process, a non-region pixel whose distance from the closest region pixel is no greater than a prescribed expansion distance is selected and converted to a region pixel. This process serves to expand the contour of the target region for the prescribed expansion distance about the entire periphery. Thus, the expansion process is generally any process capable of expanding the dimensions, i.e., contours of the target region about its entire periphery. An example process is one that changes at least non-region edge pixels among the non-region pixels to region pixels, where non-region edge pixels are those non-region pixels that abut the region pixels.

Similarly, the contraction process performed on the target region (a candidate object region, for example) is not limited to the process described in S210 of FIG. 2 and S520 of FIG. 8, but may be any of various processes that contract the dimensions of the target region. In one possible contraction process, one of a plurality of region pixels whose distance from the closest non-region pixel is no greater than a prescribed contraction distance is selected and converted to a non-region pixel. This process serves to contract the contour of the target region the prescribed contraction distance about the entire periphery. In general, the contraction process may be any process that serves to contract the dimensions, i.e., contours of the target region about its entire periphery. For example, the contraction process may involve changing at least region edge pixels among the region pixels to non-region pixels, where region edge pixels are region pixels that abut non-region pixels.

(5) The combined object regions identified by the region consolidation unit 425 (the combined object region 82q in the example of FIG. 9C) may be used for various purposes and not just for identifying gap regions (the gap region 82g in the example of FIG. 9D). For example, a combined object region may be used for identifying a consolidated object region in S242 of FIG. 3. That is, the contact extraction unit 422 may identify a plurality of candidate object regions forming a single combined object region identified by the region consolidation unit 425 as a single consolidated object region.

(6) While the grid pattern 80p described with reference to FIG. 6B is used as the extraction pattern in the first embodiment for extracting a plurality of unconnected partial regions from the encircling line region (i.e., a pattern representing a plurality of valid partial areas), various other patterns may be employed. For example, the extraction pattern may be configured of invalid partial areas represented by grid lines configured of a plurality of lines extending in the first direction Dx and a plurality of lines extending in the second direction Dy, and valid partial areas represented by the regions between lines. The extraction pattern may be configured of a pattern having a plurality of valid partial areas extending radially from a center position (hereinafter called a "radial pattern"). In a radial pattern, the plurality of valid partial areas and the plurality of invalid partial areas extend radially from a common reference position in different directions from each other. Lines of a prescribed width may serve as the invalid partial areas, for example. In this case, every valid partial area has a fan shape centered on the reference position. The valid partial areas and invalid partial areas are alternately arranged in the clockwise direction about the reference position. The contact extraction unit 422 extracts the plurality of unconnected partial regions by arranging the radial pattern over the encircling line region such that the reference position is enclosed by the encircling line region. In general, any type of pattern that represents a plurality of valid partial areas may be used as the extraction pattern.

(7) While a method using an extraction pattern is one possible way, any of various other methods may be used to extract a plurality of unconnected partial regions from an encircling line region. For example, the contact extraction unit 422 may acquire a plurality of unconnected partial regions by severing the encircling line region at equal intervals along its longitudinal dimension. The longitudinal dimension of the encircling line region may be set to the extended direction of a thin line obtained by performing a thinning process on the encircling line region. The thinning process may be any well-known process, such as one employing Hilditch's thinning algorithm. In any case, the contact extraction unit 422 can preferably extract a plurality of unconnected partial regions juxtaposed along the encircling line.

(8) The process for correcting the color of a gap region (S540 of FIG. 8) is not limited to the interpolation process described with reference to FIG. 9E, but may be any of various processes that set the color of pixels in the gap region (the gap region 82g in this example) based on the color of the inner candidate object region (the second inner candidate region 82ci in this example), and the outer candidate object region (the second outer candidate region 82co in this example). As an example with reference to FIG. 9E, the color modification unit 430 may calculate the color value of the target pixel Pxt using color values of a pixel in the second inner candidate region 82ci whose distance from the target pixel Pxt is no greater than a prescribed threshold value, and a pixel in the second outer candidate region 82co whose distance from the target pixel Pxt is no greater than a prescribed threshold value. Further, any of various representative values obtained from the color values of a plurality of pixels (the average, mode, or median, for example) may be employed as the calculated color value.

(9) The steps in the image process may be modified in various ways and are not limited to the steps described in FIGS. 2 and 3. For example, any of various methods may be used to identify regions constituting encircling lines (i.e., encircling line regions) and regions not constituting encircling lines based on the target image and is not limited to the method described in S205-S220 of FIG. 2. For example, step S210 may be omitted from the process. Further, pattern matching using prescribed patterns representing typical encircling line regions may be performed to identify encircling line regions in a target image. Further, the process in step S255 is not limited to a process for erasing objects enclosed by the encircling lines (in other words, objects selected by encircling lines), but may be any process using objects enclosed by the encircling lines. For example, a process may be performed to erase all other objects in the image, while retaining the objects enclosed by the encircling lines. Further, the process for correcting the color in a gap region (S240 of FIG. 3) may be omitted. Omitting this process eliminates the need for the color modification unit 430. Here, the gap region may retain the original color of the encircling line. The region consolidation unit 425 may also be eliminated. In this case, processed data representing the consolidated object regions after the encircling line regions have been removed may be used for printing or other applications. Further, the process for correcting the color of the encircling line regions (S250 of FIG. 3) may be omitted.

(10) The data processed according to the present invention may be employed in any application in addition to printing. For example, the processed data acquisition unit 230 of the multifunction peripheral 100 may store the processed data in the nonvolatile storage device 130 for future use. Further, the destination of the processed data outputted by the processed data output unit 450 may be any device in addition to the multifunction peripheral 100. For example, the processed data output unit 450 may output the processed data to another server (not shown) connected to the network 500.

(11) In addition to scan data produced by the reading unit 160, the target image data may be photographic image data captured by a device such as a digital camera, or image data generated using an application program for creating data such as text or illustrations, for example. Further, the encircling lines are not limited to those written with a pen, but may be encircling lines drawn over the image using the application program described above, for example.

(12) The functions in the embodiment of FIG. 1 for executing the image process (for example, the function of the image-processing unit 390, and specifically the functions of the process units 410, 411, 412, 413, 420 (422, 424), 425, 430, 440, and 450) may be implemented by various other devices than the server 300, such as a digital camera, a scanner, a personal computer, and a mobile telephone. Further, the functions of the image-processing unit 390 may be shared among a plurality of devices (computers, for example) capable of communicating over a network, so that the devices as a whole can provide the functions of the image-processing unit 390 (here, the system comprising the devices corresponds to the image processor).

Part of the configuration implemented in hardware in the embodiments described above may be replaced with software and, conversely, all or part of the configuration implemented in software in the embodiments may be replaced with hardware. For example, the functions of the extraction unit 420 in FIG. 1 may be implemented by dedicated hardware configured of logic circuits.

When all or part of the functions of the present invention are implemented with computer programs, the programs can be stored on a computer-readable storage medium (a non-temporary storage medium, for example). The programs may be used on the same storage medium on which they were supplied, or may be transferred to a different storage medium (computer-readable storage medium). The "computer-readable storage medium" may be a portable storage medium, such as a memory card or CD-ROM; an internal storage device built into the computer, such as any of various ROM; or an external storage device, such as a hard disk drive connected to the computer.

While the invention has been described in detail with reference to specific embodiments and variations thereof, it would be apparent to those skilled in the art that many modifications and variations may be made therein without departing from the spirit of the invention, the scope of which is defined by the attached claims.

What is claimed is:

1. An image-processing device comprising:
a processor; and
a memory storing computer-readable instructions therein, the computer-readable instructions, when executed by the processor, causing the image-processing device to perform:
acquiring a target image represented by target computerized image data;
identifying an encircling line region defined by a plurality of pixels having a first color, the encircling line region specifying a part of the target image;
identifying an object region defined by a plurality of pixels having a second color, the second color being different from a background color of the target image;
determining a candidate region by using both the identified encircling line region and the identified object region, the candidate region being different from the encircling line region; and
extracting from the target computerized image data a contacting object region, the contacting object region including a first candidate region and a second candidate region, the contacting object region satisfying the following conditions (A) and (B):
(A) the first candidate region is disposed on an inner peripheral side of the encircling line region, and the second candidate region is disposed on an outer peripheral side of the encircling line region; and
(B) each of the first candidate region and the second candidate region abuts the encircling line region, and the first candidate region and the second candidate region confront each other across the encircling line region;
modifying the target computerized image data based on the extracted contacting object region; and
communicating, to an image outputting device, the modified target computerized image data.

2. An image-processing device comprising:
a processor; and
a memory storing computer-readable instructions therein, the computer-readable instructions, when executed by the processor, causing the image-processing device to perform:
acquiring a target image represented by target computerized image data;
identifying an encircling line region defined by a plurality of pixels having a first color, the encircling line region specifying a part of the target image;
identifying an object region defined by a plurality of pixels having a second color, the second color being different from a background color of the target image;
determining a candidate region by using both the identified encircling line region and the identified object region, the candidate region being different from the encircling line region; and
extracting from the target computerized image data at least a first candidate region included in a contacting object region, the contacting object region including the first candidate region and a second candidate region, the contacting object region satisfying the following conditions (A), (B) and (C):

(A) the first candidate region is disposed on an inner peripheral side of the encircling line region, and the second candidate region is disposed on an outer peripheral side of the encircling line region;

(B) each of the first candidate region and the second candidate region abuts the encircling line region, and the first candidate region and the second candidate region confront each other across the encircling line region; and (C) a ratio of the first candidate region to a sum of the first candidate region and the second candidate region is greater than or equal to a prescribed value;

modifying the target computerized image data based on the extracted at least first candidate region; and communicating, to an image outputting device, the modified target computerized image data.

3. The image-processing device according to claim 1, wherein the instructions further cause the image-processing device to perform:

combining the first candidate region and the second candidate region by:
expanding the first candidate region and the second candidate region; and
contracting the first candidate region and the second candidate region that have been expanded; and identifying, as a combined object region, a region being a combination of the first candidate region and the second candidate region that have been expanded and contracted.

4. The image-processing device according to claim 3, wherein the instructions further cause the image-processing device to perform:

identifying a gap region included in the combined object region based on the combined object region, the first candidate region corresponding to the combined object region, and the second candidate region corresponding to the combined object region; and changing a color of the gap region based on a color of the first candidate region and a color of the second candidate region.

5. The image-processing device according to claim 1, wherein the instructions further cause the image-processing device to perform extracting a plurality of unconnected partial regions composing the encircling line region, the plurality of unconnected partial regions being separated from each other, each of the plurality of unconnected partial regions having a region extending between an inner peripheral edge of the encircling line region and an outer peripheral edge of the encircling line region; and wherein the first candidate region and the second candidate region satisfy the condition (B) when each of the first candidate region and the second candidate region abuts one of the plurality of unconnected partial regions.

6. The image-processing device according to claim 5, wherein the plurality of unconnected partial regions is set based on a prescribed pattern representing a plurality of valid partial areas, the encircling line region having first portions, the first portions overlapping the plurality of valid partial areas and being used as the plurality of unconnected partial regions.

7. The image-processing device according to claim 6, wherein the prescribed pattern is configured of the plurality of valid partial areas and a plurality of invalid partial areas, the plurality of valid partial areas and the plurality of invalid partial areas being arranged alternately in a grid pattern, the encircling line region having second portions, the second portions overlapping the plurality of invalid partial areas and failing to be used as the plurality of unconnected partial regions.

8. A non-transitory computer readable storage medium storing a set of program instructions thereon that, when executed by a computer, cause the computer to perform operations comprising:

acquiring a target image represented by target computerized image data;

identifying an encircling line region defined by a plurality of pixels having a first color, the encircling line region specifying a part of the target image;

identifying an object region defined by a plurality of pixels having a second color, the second color being different from a background color of the target image;

determining a candidate region by using both the identified encircling line region and the identified object region, the candidate region being different from the encircling line region; and extracting from the target computerized image data a contacting object region, the contacting object region including a first candidate region and a second candidate region, the contacting object region satisfying the following conditions (A) and (B):

(A) the first candidate region is disposed on an inner peripheral side of the encircling line region, and the second candidate region is disposed on an outer peripheral side of the encircling line region; and (B) each of the first candidate region and the second candidate region abuts the encircling line region, and the first candidate region and the second candidate region confront each other across the encircling line region;

modifying the target computerized image data based on the extracted contacting object region; and communicating, to an image outputting device, the modified target computerized image data.

9. A non-transitory computer readable storage medium storing a set of program instructions thereon that, when executed by a computer, cause the computer to perform operations comprising:

acquiring a target image represented by target computerized image data;

identifying an encircling line region defined by a plurality of pixels having a first color, the encircling line region specifying a part of the target image;

identifying an object region defined by a plurality of pixels having a second color, the second color being different from a background color of the target image;

determining a candidate region by using both the identified encircling line region and the identified object region, the candidate region being different from the encircling line region; and extracting from the target computerized image data at least a first candidate region included in a contacting object region, the contacting object region including the first candidate region and a second candidate region, the contacting object region satisfying the following conditions (A), (B) and (C):

(A) the first candidate region is disposed on an inner peripheral side of the encircling line region, and the second candidate region is disposed on an outer peripheral side of the encircling line region;

(B) each of the first candidate region and the second candidate region abuts the encircling line region, and the first candidate region and the second candidate region confront each other across the encircling line region; and (C) a ratio of the first candidate region to a sum of the first candidate region and the second candidate region is greater than or equal to a prescribed value;

modifying the target computerized image data based on the extracted at least first candidate region; and communicating, to an image outputting device, the modified target computerized image data.

* * * * *